C. J. JOHNSON.
AUTOMATIC TRAILER COUPLING MECHANISM.
APPLICATION FILED MAR 4, 1920.
1,373,431.
Patented Apr. 5, 1921.
2 SHEETS—SHEET 2.
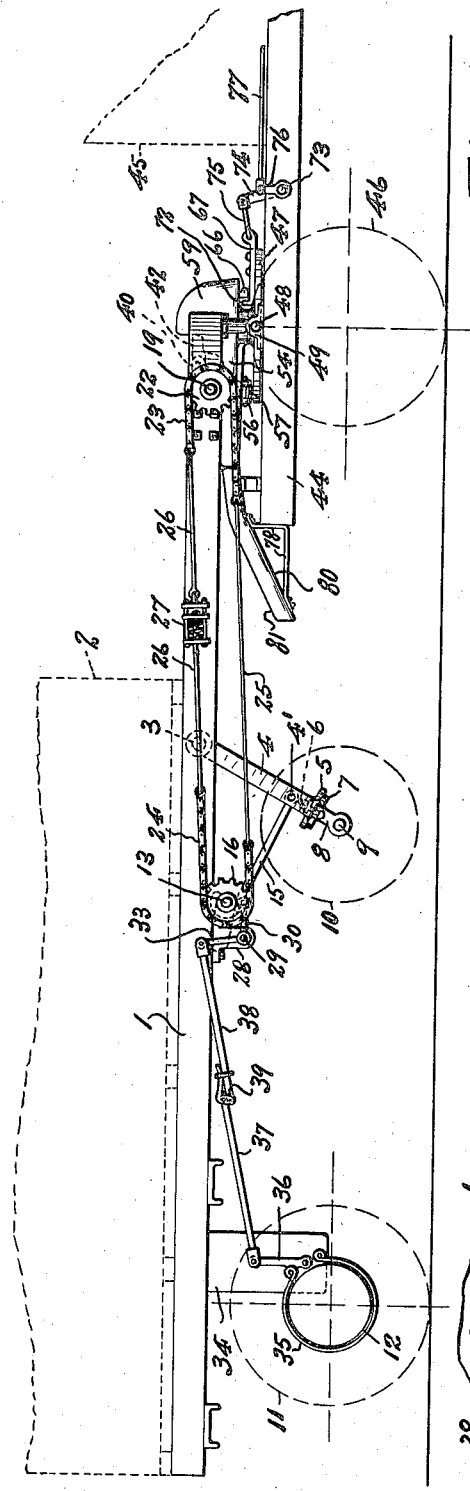
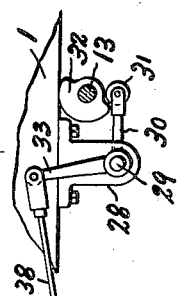
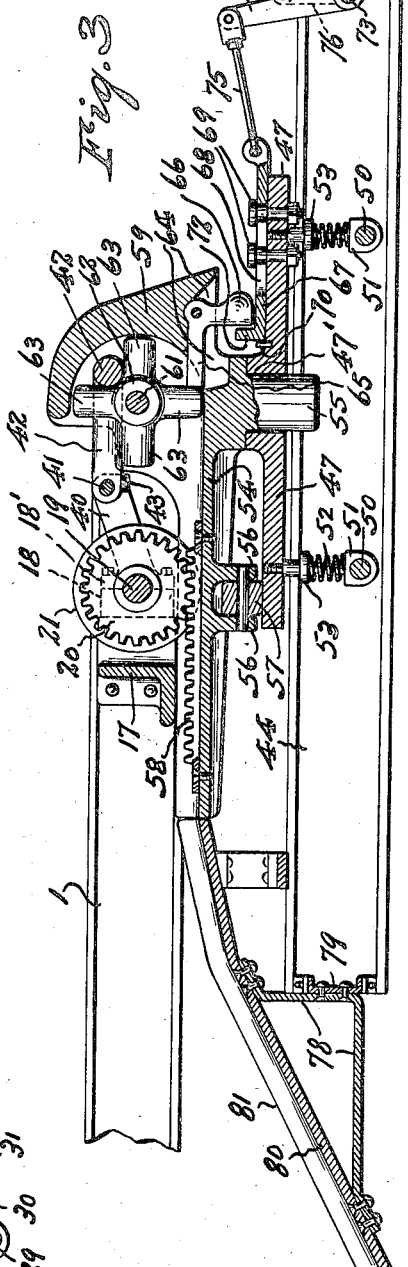
INVENTOR
Charles J. Johnson,
BY
Frantzef & Richards,
ATTORNEYS

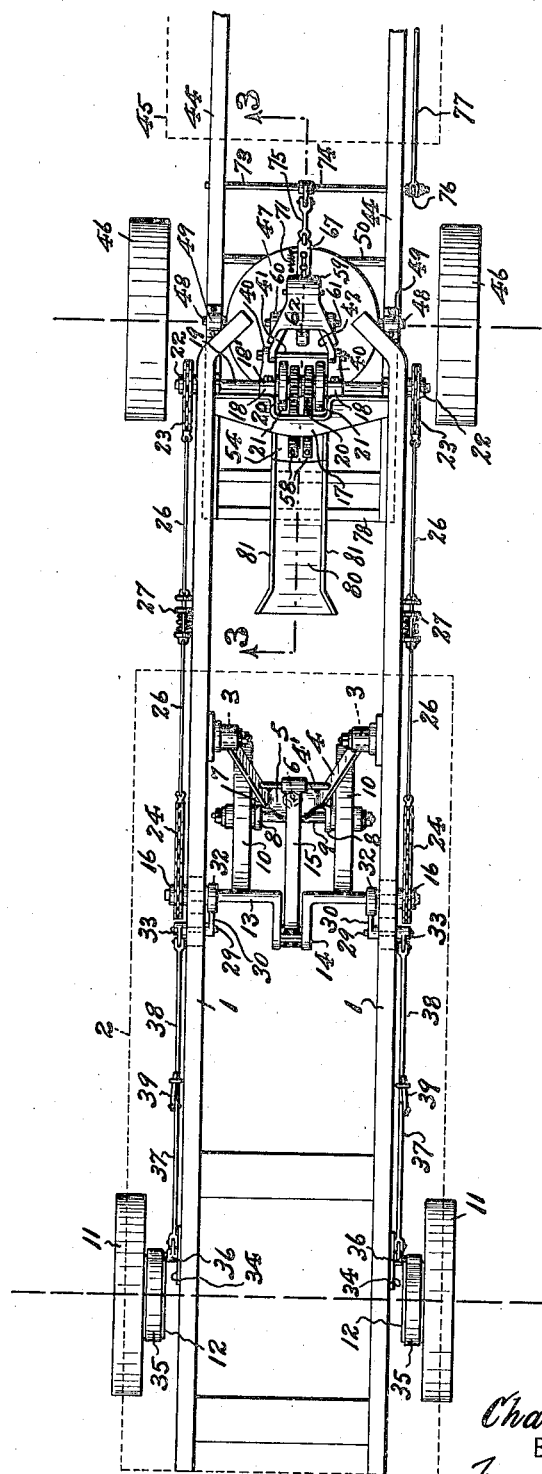

UNITED STATES PATENT OFFICE.

CHARLES J. JOHNSON, OF BLOOMFIELD, NEW JERSEY, ASSIGNOR OF ONE-HALF TO GUSTAV A. JOHNSON, OF NEWARK, NEW JERSEY.

AUTOMATIC TRAILER-COUPLING MECHANISM.

1,373,431.      Specification of Letters Patent.      Patented Apr. 5, 1921.

Application filed March 4, 1920. Serial No. 363,122.

*To all whom it may concern:*

Be it known that I, CHARLES J. JOHNSON, a citizen of the United States, residing at Bloomfield, in the county of Essex and State of New Jersey, have invented certain new and useful Improvements in Automatic Trailer-Coupling Mechanism, and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in trailers for self propelled vehicles or tractors; and the invention has reference, more particularly, to an improved construction of trailer and automatic coupling mechanism for operatively connecting or disconnecting the same from a power tractor.

The invention has for its principal object to provide a novel construction of trailer and automatic coupling mechanism therefor, so arranged that the operator of the tractor may, by backing the latter into a position in front of the trailer, cause the same to be mutually interconnected or coupled together without necessity of any other manual operations, or need of the assistance of others in so doing.

The invention has for a further object to provide a novel construction of automatic coupling device per se, together with a simple means for releasing the same for uncoupling operations.

Other objects of the present invention, not at this time more particularly enumerated, will be clearly understood from the following detail description of the same.

With the various objects of the present invention in view, the same consists, primarily, in the novel construction of trailer mechanism and automatic coupling means therefor hereinafter set forth; and, the invention consists, furthermore, in the novel arrangements and combinations of the various devices and parts, as well as in the details of the construction of the same, all of which will be hereinafter more fully described, and then finally embodied in the appended claims.

The invention is clearly illustrated in the accompanying drawings, in which:—

Figure 1 is a plan view of a portion of a tractor chassis and a trailer chassis embodying the principles of the present invention, and provided with the novel automatic coupling mechanism for operatively connecting the same together, the latter mechanism being shown in coupled position; Fig. 2 is a side elevation of the parts shown in said Fig. 1; Fig. 3 is a detail longitudinal vertical section of the automatic coupling mechanism, taken on line 3—3 in said Fig. 1, and drawn on an enlarged scale; and Fig. 4 is a detail view of certain elements of the trailer mechanism designed to automatically release or set the trailer brakes as said trailer is coupled or uncoupled from the tractor.

Similar characters of reference are employed in all of the hereinabove described views, to indicate corresponding parts.

Referring now to said drawings, the reference character 1 indicates the longitudinally extending laterally spaced apart side members of the trailer chassis, upon which the body 2 (indicated by dotted lines in Figs. 1 and 2) is mounted.

Secured to said chassis side members 1, in transversely opposed relation one to the other, are a pair of journal studs 3, from which is pivotally suspended a swinging frame 4, having at its lower free end a carrying plate 5. Pivoted to said carrying plate 5, by a king bolt 6, is an axle supporting frame 7, having a pair of depending arms 8 in which is journaled an axle 9 for mounting the forward wheels 10 of the trailer. This method of mounting said forward wheels 10 allows for the necessary swiveling of the supporting frame 7 relative to the swinging frame 4, which permits the forward wheels to be turned, when in service, for steering or guiding the trailer if movements of the same, while uncoupled from a tractor, are desired to be made. The rear wheels 11 of the trailer may be mounted in connection with the chassis frame in any well known or desired manner, and the same may be provided with brake-drums 12 of the usual construction.

Journaled in connection with the chassis side members 1, so as to extend transversely thereof in the rear of the forward wheel structure, is a crank-shaft 13 provided with a crank-portion 14. Interconnecting said crank-portion with a transverse rod 4' of said swinging frame 4 is a link or connecting rod 15. Secured to the respective outer ends of said crank-shaft 13 are sprocket wheels 16.

The forward ends of said side members 1 of the trailer chassis frame project forwardly beyond the front end of the trailer body. Secured to said side members 1, so as to extend between the same adjacent to the outer or forward extremities thereof, is a transverse bracket member 17 provided with bearing portions 18 in which is journaled a transverse shaft 19. Fixed upon said shaft 19, preferably in a central location intermediate its ends, are spur-gears 20. Also mounted on said shaft 19, adjacent to the outer sides of said spur-gears 20, are idler or tracker rollers 21. Fixed upon the respective outer ends of said shaft 19 are sprocket wheels 22. Transmission chains 23 run over said respective sprocket wheels 22, and like transmission chains 24 run over said respective sprocket wheels 16 of said crank-shaft 13. The lower ends of said chains 23 and 24 are connected together by means of a link rod 25, and the upper ends of said chains 23 and 24 are connected together by link rods 26, having their adjoining ends mutually engaged with a shock-absorbing element 27 of any suitable construction.

An automatic brake mechanism for the rear wheels of the trailer is provided, the same being arranged to be automatically controlled by the movements imparted to the crank-shaft 13. This mechanism comprises suitable bearings 28 secured to said chassis side members 1 to journal stud shafts 29. Secured upon the inner end of each stud shaft 29 is a lever 30, provided at its free end with an anti-friction roller 31. Said levers 30 are so disposed that their free ends project beneath cam-members 32 fixed on said crank-shaft 13, so that said anti-friction rollers are engaged by said cam-members when said levers are operated thereby. Secured upon the outer ends of said stud shafts 29 are upwardly projecting levers 33. Connected with said side members 1 of the chassis frame adjacent to the rear wheels are suitably constructed brackets 34. Pivotally anchored on said brackets 34 are the fixed ends of brake-bands 35, which extend around said brake-drums 12 of said rear wheels. Also pivotally mounted upon said brackets 34 are brake-band levers 36 to which the free ends of said brake-bands 35 are connected. Interconnecting said levers 33 with said brake-band levers 36 are draw links or pull rods, preferably arranged to provide two sections in substantial end to end relation, and having their adjoining ends interconnected by a tension releasing element 39, so that, if desired, the normal pulling tension exercised upon and transmitted by the links or pull rods 37 and 38, while the brake controlling mechanism is in position to hold the brakes set, may be released by a hand manipulation of said tension releasing element 39, thus relaxing the brakes so that the trailer may be moved while disconnected from the tractor.

Connected with the bracket member 17, preferably by forming the same as an integral part of the caps 18' of the central bearing portions 18 are forwardly extending lugs or ears 40, one on each side of the arrangement of gears and rollers 20 and 21. Pivoted to the free ends of said lugs or ears 40, by means of a nut and bolt device 41, is a coupling yoke 42, preferably of a V-shape with its closed end projecting forwardly. Said coupling yoke 42 is prevented from dropping out of a normally forwardly projecting position by means of stop lugs 43, which project laterally from said ears 40 beneath the arms of said coupling yoke beyond the pivotal connection of the latter with said ears 40, said coupling yoke is free, however, for upward swinging movement.

The reference character 44 indicates the longitudinally extending laterally spaced apart side members of a tractor chassis, upon which the tractor body 45 (indicated by dotted lines in Figs. 1 and 2) is mounted. The reference-character 46 indicates the rear wheels of said tractor, which may be mounted in connection with the chassis in any well known or desired manner. The reference-character 47 indicates a base plate, provided at its periphery with oppositely and laterally projecting journals 48, which are mounted in bearings 49 secured on said side members 44, to permit oscillations of said base plate on a transverse axis. Lateral struts 50, interconnected between said side members 44 beneath said base plate 47, carry seating members 51 for supporting cushioning springs 52, the latter having their upper ends engaged upon seating members 53 connected with longitudinally opposite portions of the under side of said base plate. Said springs 52 serve to cushion the oscillatory movements of said base plate. Said base plate 47 is provided with a centrally disposed vertical bearing member 47'. The reference-character 54 indicates a turn table having a downwardly projecting pivot stud 55 which is journaled in said bearing member 47' to mount said turn table for horizontal swinging or swiveling movements in connection with said base plate. The underside of said turn table 54 is provided with bearing ears 56 for journaling an antifriction roller 57 arranged to ride upon said base plate 47. Secured upon the upper surface of the rearward portion of said turn table 54 are longitudinally disposed toothed racks 58 engageable by said spur gears 20 of the trailer mechanism, in a manner to be subsequently described with more particularity. Connected with the forward end of said turn table is a housing 59 open at its rearward side. The side walls of said housing are provided with suitably disposed bearings 60 for mounting a transverse axle member 61, upon which is rotatably arranged within said housing a star-wheel 62 having a plurality of radiating arms 63. The rear of said turn table and its housing is cut away at 64 to provide a seat for a latch-dog 65 which is pivotally mounted therein, so that said latch-dog normally extends horizontally and rearwardly into abutting engagement with a downwardly projecting vertically disposed arm 63 of said star-wheel 62, thus preventing the latter from turning backward. Said latch-dog 65 possesses a downwardly depending arm 66, the weight of which overbalances the weight of said latch-dog proper, whereby gravity will always tend to move and maintain said parts in normal operative position. Said latch-dog 65 is so disposed in the cutaway portion 64, that while it is properly stopped in normal position it is nevertheless free to swing or turn downwardly out of the path of movement of said star-wheel arm 63, and will therefore readily yield to forward turning movements of said star-wheel, also the same may be manually operated or controlled to remove it from normal engagement with said star wheel when it is desired to permit backward turning movements of the latter. The means for manually operating said latch-dog 65 comprises a slide-bar 67 mounted on said base-plate beneath the forward end of said turn table 54, when the latter is in normal longitudinal disposition. Said slide-bar is provided with a slot 68 which rides upon studs 69 fastened to said base plate, so that said slide-bar is thereby guided during its longitudinal sliding movements. A stop pin 70 fixed in said base plate determines the normal position of said slide-bar, the latter being impelled to normal stopped position against said stop-pin 70 by a suitably mounted pull spring 71. The rearward end of said slide-bar is provided with a perpendicular transverse lug 72 which is disposed behind said depending arm 66 of said latch-dog 65, so as to engage the same to actuate the latter when said slide-bar is drawn forward. Journaled in said side members 44 of said tractor chassis, so as to extend therebetween, is a transverse rock-shaft 73, upon which is fixed an upwardly extending lever 74, the free end of which is interconnected with said slide-bar by means of a link 75. Said rock-shaft 73 is oscillated by a lever 76, in turn operated by a pull-rod 77 extending between said lever 76, and a foot or hand lever (not shown) located near the driver's seat of the tractor, so as to be easily within the reach and control of the driver of the tractor. It will be apparent that when the tractor and trailer are straightened out in substantially longitudinal alinement, the tractor driver, by manipulation of the manual control mechanism above described, may cause a forward movement of the slide-bar 67, which is transmitted by said lug 72 to said depending arm 66 of said latch-dog 65 whereby said arm 66 is swung forward and said latch-dog swung downward out of the path of movement of said star-wheel arms, thus permitting the latter to turn backward and release the coupling yoke 42 of the trailer, when the tractor moves forward, as will be subsequently further described. The advantage of the above described arrangement of manual control mechanism is that turning movements of the turn table 54 will not be impeded by any positive connection between the latch-dog 65 and the operating means therefor, nor will the said operating means be disarranged, since such turning movements will carry the depending arm 66 sidewise away from the lug 72 of the slide-bar, when the coupled tractor and trailer are making sharp turns; furthermore, the said arrangement is advantageous since it prevents manual operation of the latch-dog under all conditions except when the turn-table is longitudinally disposed, or in other words except when the coupled tractor and trailer are in substantial longitudinal alinement, in which position coupling and uncoupling operations are best performed.

Connected by suitable supporting brackets 78 secured to the rear end bar 79 of the chassis frame of the tractor is an upwardly and forwardly extending longitudinally disposed inclined plane or guide chute 80, having side guard flanges 81. Normally the outer rear end of the turn table 54 is registered and alined with the inner-forward end of said inclined plane or guide chute 80.

Having thus described the detail construction of the novel trailer and automatic coupling mechanism, it remains to briefly describe the operative functioning of the same.

When the trailer stands alone in its uncoupled relation to the tractor, its fore wheels are in lowered supporting relation to the front end of the same, and also the cams 32 are related to the brake mechanism so as to positively engage the same in a position holding the brake-bands 35 in set relation to the brake drums 12 of the rear wheels 11. When it is desired to couple said trailer, thus standing, to a tractor, the operation may be automatically accomplished merely by bringing the tractor to a position in front of the trailer and in substantially longitudinal alinement therewith, and then backing the tractor to bring the same into engagement with the forward end of the trailer and the coupling mechanism mounted thereon, which through such movement automatically connects itself with the associate parts of the said coupling mechanism carried by the tractor at its rear end.

The operation of the mechanism under the above stated conditions is as follows:—

As the tractor backs up to the trailer, the downwardly and rearwardly inclined free end of said inclined plane 80 is carried into engagement with the idler or tracker rollers 21, which ride up the said inclined plane 80 on to the turn table 54, thus raising upward the forward end of the trailer chassis so that fore wheels 10 are lifted clear of the ground. As the tracker rollers 21 ride on to the turn table 54, the continued backing movement of the tractor carries the racks 58 of said turn table into engagement with the spur gears 20, transmitting through the same a forward rotary motion to said shaft 19 and its sprocket wheels 22. The motion of the sprocket wheels 22 is in turn transmitted through the chain and link connections 23, 24, 25 and 26 to the sprocket wheels 16, to thereby rotate the crank shaft 13 of the trailer, any violence or shock in the transmission of said motion being absorbed by the shock-absorbing element 27. In thus rotating the crank-shaft 13 the crank 14 is operated to lift or swing rearwardly and upwardly the fore wheels 10, by means of the interconnecting link 15, to an out of service position. The rotation of the crank shaft 13 carries the cams 32 into releasing position relative to the levers 30 and their rollers 31, so that the same may swing upwardly, thereby rocking the stud shafts 29 to swing rearwardly the levers 33, to release their pull, exerted through the pull rods 37 and 38, upon the brake-band levers 36, thus permitting the same to yield to the releasing movement of the brake-bands 35, so that the latter are freed from the brake-drums 12, and the trailer rear wheels freed for normal traction.

As the tractor continues its rearward movement toward the trailer, the forwardly projecting free end of the coupling yoke 42 enters the housing 59, and engages an upwardly projecting arm 63 of said star-wheel 62, said arm yielding to the inward passage of said coupling yoke 42 by reason of the freely permitted forward rotary movement imparted thereby to the star-wheel. The forward rotary movement of the star-wheel causes the next succeeding arm 63 to be turned upwardly behind and within the embrace of the coupling yoke, until the same assumes a vertical position, and the latch-dog 65 (which yields to the passage over the same of the arms 63 when the star-wheel 62 turns in a forward direction) resumes normal engaged position with the downwardly extending arm 63 of the star-wheel 62, thereby obstructing backward rotary movement of the latter under the drag of the coupling-yoke 42 upon the engaged arm 63. It follows that, upon the completion of the above operations the trailer is secured in operative coupled relation to the tractor, the said operations having been accomplished in an entirely automatic manner. The trailer being thus coupled to the tractor, the latter may now be driven ahead to drag after it the trailer. As will be apparent from an inspection of the drawings, the forward end of the trailer chassis is lifted so that the turn table 54 bears the weight. The turn table swivels freely on its pivot post 55, so that turning movements of the tractor are readily permitted, and at the same time, the base plate 47 being free to oscillate on its transverse axis, a properly flexible interconnection between the tractor and trailer is assured, so that no undue strains are placed upon the coupling mechanism of the same or upon their respective chassis structures due to uneven road surfaces over which they move.

When it is desired to uncouple the trailer from the tractor, the driver is not required to leave his seat, but merely manipulates the tractor and trailer into the desired location, and thereupon operates a foot or hand lever to draw forward the slide-bar 67, as above explained, thereby depressing the latch-dog 65 to free the star-wheel 62 for backward rotation, so that by merely driving the tractor forward the up-standing star-wheel arm 63 is engaged by the coupling yoke 42, as the latter moves out of the housing 59, the star-wheel thus being caused to rotate in a backward direction so that said up-standing arm 63 yields and turns backward allowing the coupling yoke 42 to pass over the same to uncoupled position. As the tractor continues to move forward, the racks 58 reverse the rotation of the shaft 19, and through the interconnecting transmission mechanism, the crank-shaft 13 is reversely rotated, thereupon the trailer fore-wheels 10 are lowered to operative supporting position, and at the same time the rear wheel brake mechanism is set in locked position, by means of a reversal of the operations already above described. The tracker rollers 21 ride off of the turn table 54 and down the chute 80, thereupon lowering the forward end of the trailer to position the fore-wheels on the ground, and thus leaving the trailer standing in desired position.

It will be clear that the present invention provides an automatic coupling mechanism of novel character, and capable of being released by the driver of the tractor in a most convenient manner and without the necessity of assistance from their parties.

I am aware that some changes may be made in the several arrangements and combinations of the various devices and parts, as well as in the details of the construction of the same, without departing from the scope of the present invention as set forth in the foregoing specification, and as defined in the appended claims. Hence, I do not limit my invention to the exact arrangements and combinations of the several devices and parts described in the foregoing specification, nor do I confine myself to the exact details of the construction of the said parts as illustrated in the acompanying drawings.

I claim:—

1. The combination with a trailer chassis and a tractor chassis of a transverse shaft mounted at the forward end of said trailer chassis, tracker rollers mounted on said shaft, a forwardly projecting coupling yoke connected with said trailer chassis forward of said shaft and its rollers, a turn table mounted upon said tractor chassis to swivel in a horizontal plane, an automatic self locking coupling mechanism mounted on said turn table engageable with said coupling yoke by bumping contact therewith, and an inclined plane fixed to the rear end of said tractor chassis with the upper forward end of which said turn table is normally alined, said tracker rollers of said trailer chassis being adapted to ride upwardly over said inclined plane on to said turn table thereby lifting the forward end of said trailer chassis and guiding said coupling yoke into operative engagement with said automatic coupling mechanism.

2. The combination with a trailer chassis and a tractor chassis of a transverse shaft mounted at the forward end of said trailer chassis, tracker rollers mounted on said shaft, a forwardly projecting coupling yoke connected with said trailer chassis forward of said shaft and its rollers, a turn table mounted upon said tractor chassis to swivel in a horizontal plane, an automatic coupling mechanism mounted on said turn table engageable with said coupling yoke by bumping contact therewith, an inclined plane fixed to the rear end of said tractor chassis with the upper forward end of which said turn table is normally alined, said tracker rollers of said trailer chassis being adapted to ride upwardly over said inclined plane on to said turn table thereby lifting the forward end of said trailer chassis and guiding said coupling yoke into operative engagement with said automatic coupling mechanism, trailer fore-wheels, a swinging frame pivoted to said trailer chassis to support said trailer fore-wheels, a transverse crank-shaft journaled in said trailer chassis, an interconnecting link between said crank-shaft and said swinging frame, longitudinal rack means fixed on said turn table, a spur gear fixed on said transverse shaft of said trailer chassis engageable by said rack means for rotating said transverse shaft, and transmission means between said transverse shaft and said crank-shaft for operating the latter to lift said trailer fore-wheels out of service when the trailer is coupled with the tractor.

3. The combination with a trailer chassis and a tractor chassis of a transverse shaft mounted at the forward end of said trailer chassis, tracker rollers mounted on said shaft, a forwardly projecting coupling yoke connected with said trailer chassis forward of said shaft and its rollers, a turn table mounted upon said tractor chassis to swivel in a horizontal plane, an automatic coupling mechanism mounted on said turn table engageable with said coupling yoke by bumping contact therewith, an inclined plane fixed to the rear end of said tractor chassis with the upper forward end of which said turn table is normally alined, said tracker rollers of said trailer chassis being adapted to ride upwardly over said inclined plane on to said turn table thereby lifting the forward end of said trailer chassis and guiding said coupling yoke into operative engagement with said automatic coupling mechanism, trailer fore-wheels, a swinging frame pivoted to said trailer chassis to support said trailer fore-wheels, a transverse crank-shaft journaled in said trailer chassis, an interconnecting line between said crank-shaft and said swinging frame, longitudinal rack means fixed on said turn table, a spur gear fixed on said transverse shaft of said trailer chassis engageable by said rack means for rotating said transverse shaft, transmission means between said transverse shaft and said crank-shaft for operating the latter to lift said trailer fore-wheels out of services when the trailer is coupled with the tractor, trailer rear wheels having brake-drums associated therewith, brake bands operatively related to said drums, and means operated by the reverse rotation of said crank-shaft for setting said brake bands in braking position.

4. The combination with a trailer chassis and a tractor chassis of a transverse shaft mounted at the forward end of said trailer chassis, tracker rollers on said shaft, a forwardly projecting coupling yoke forward of said shaft and its rollers, a base-plate pivotally mounted on said tractor chassis for oscillation on a transverse axis, a turn table mounted on said base-plate to swivel in a horizontal plane, a coupling mechanism mounted on said turn table engageable with said coupling yoke, an inclined plane fixed to the rear end of said tractor chassis with the upper forward end of which said turn table is normally alined for the purposes described, trailer fore-wheels, a swinging frame pivoted to said trailer chassis to support said fore-wheels, means on said trailer chassis for swinging said frame to lift said fore-wheels out of service, mutually coöperating means connected with said turn table and said transverse shaft whereby the latter is rotated during the coupling operations, and transmission means interconnected between said swinging frame controlling means and said transverse shaft.

5. The combination with a trailer chassis and a tractor chassis of a transverse shaft mounted at the forward end of said trailer chassis, tracker rollers on said shaft, a forwardly projecting coupling yoke forward of said shaft and its rollers, a base-plate pivotally mounted on said tractor chassis for oscillation on a transverse axis, a turn table mounted on said base-plate to swivel in a horizontal plane, a coupling mechanism mounted on said turn table engageable with said coupling yoke, an inclined plane fixed to the rear end of said tractor chassis with the upper forward end of which said turn table is normally alined for the purposes described, trailer fore-wheels, a swinging frame pivoted to said trailer chassis to support said fore-wheels, means on said trailer chassis for swinging said frame to lift said fore-wheels out of service, mutually coöperating means connected with said turn table and said transverse shaft whereby the latter is rotated during the coupling operations, transmission means interconnected between said swinging frame controlling means and said transverse shaft, trailer rear wheels having a brake mechanism associated therewith, and means for automatically setting said brake mechanism in braking position when said swinging frame is operated to move said trailer fore-wheels into normal supporting position.

6. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a turn table mounted upon said tractor chassis to swivel in a horizontal plane, a housing open at its rearward side connected with said turn table, a star-wheel mounted in said housing to rotate in a longitudinal vertical plane, latch means engageable with an arm of said star-wheel to hold the same against backward rotation while yielding to forward rotation thereof, said star-wheel being adapted to rotate under bumping contact with said coupling yoke to thereby turn one of its arms upwardly behind and within the embrace of said coupling yoke, and means at the rear of said tractor chassis for causing said tracker rollers to mount said turn table and guide said coupling yoke into engaged relation to said star-wheel.

7. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a turn table mounted upon said tractor chassis to swivel in a horizontal plane, a housing open at its rearward side connected with said turn table, a star-wheel mounted in said housing to rotate in a longitudinal vertical plane, latch means engageable with an arm of said star-wheel to hold the same against backward rotation while yielding to forward rotation thereof, said star wheel being adapted to rotate under bumping contact with said coupling yoke to thereby turn one of its arms upwardly behind and within the embrace of said coupling yoke, and an inclined plane fixed to the rear end of said tractor chassis with the upper forward end of which said turn table is normally alined, said tracker rollers being adapted to ride upwardly over said inclined plane on to said turn table thereby lifting the forward end of said trailer chassis and guiding said coupling yoke into operative engagement with said star-wheel.

8. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a turn table mounted upon said tractor chassis to swivel in a horizontal plane, a housing open at its rearward side connected with said turn table, a star-wheel mounted in said housing to rotate coupling yoke to thereby turn one of its arms upwardly behind and within the embrace of said coupling yoke, an inclined plane fixed to the rear end of said tractor chassis with the upper forward end of which said turn table is normally alined, said tracker rollers being adapted to ride upwardly over said inclined plane on to said turn table thereby lifting the forward end of said trailer chassis and guiding said coupling yoke into operative engagement with said star-wheel, trailer fore-wheels, a swinging frame pivoted to said trailer chassis to support said trailer fore-wheels, a transverse crank-shaft journaled in said trailer chassis, an inter-connecting link between said crank-shaft and said swinging frame, longitudinal rack means fixed on said turn table, a spur gear fixed on said transverse shaft of said trailer chassis engageable by said rack means for rotating said transverse shaft, transmission means between said transverse shaft and said crank-shaft for operating the latter to lift said trailer fore-wheels out of service when the trailer is coupled with the tractor.

9. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a turn table mounted upon said tractor chassis to swivel in a horizontal plane, a housing open at its rearward side connected with said turn table, a star-wheel mounted in said housing to rotate in a longitudinal vertical plane, latch means engageable with an arm of said star-wheel to hold the same against backward rotation while yielding to forward rotation thereof, said star-wheel being adapted to rotate under bumping contact with said coupling yoke to thereby turn one of its arms upwardly behind and within the embrace of said coupling yoke, an inclined plane fixed to the rear end of said tractor chassis with the upper forward end of which said turn table is normally alined, said tracker rollers being adapted to ride upwardly over said inclined plane on to said turn table thereby lifting the forward end of said trailer chassis and guiding said coupling yoke into operative engagement with said star-wheel, trailer fore-wheels, a swinging frame pivoted to said trailer chassis to support said trailer fore-wheels, a transverse crank-shaft journaled in said trailer chassis, an interconnecting link between said crank-shaft and said swinging frame, longitudinal rack means fixed on said turn table, a spur gear fixed on said transverse shaft of said trailer chassis engageable by said rack means for rotating said transverse shaft, transmission means between said transverse shaft and said crank-shaft for operating the latter to lift said trailer fore-wheels out of service when the trailer is coupled with the tractor, trailer rear wheels having brake means associated therewith, and means operated by the reverse rotation of said crank-shaft for setting said brake means in braking position.

10. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a turn table mounted upon said tractor chassis to swivel in a horizontal plane, a housing open at its rearward side connected with said turn table, a star-wheel mounted in said housing to rotate in a longitudinal vertical plane, latch means engageable with an arm of said star-wheel to hold the same against backward rotation while yielding to forward rotation thereof, said star-wheel being adapted to rotate under bumping contact with said coupling yoke to thereby turn one of its arms upwardly behind and within the embrace of said coupling yoke, an inclined plane fixed to the rear end of said tractor chassis with the upper forward end of which said turn table is normally alined, said tracker rollers being adapted to ride upwardly over said inclined plane on to said turn table thereby lifting the forward end of said trailer chassis and guiding said coupling yoke into operative engagement with said star-wheel, and manually controlled means for releasing said latch means from operative relation to said star-wheel.

11. The combination with a trailer chassis and a tractor chassis of a transverse shaft mounted at the forward end of said trailer chassis, tracker rollers on said shaft, a forwardly projecting coupling yoke connected with said trailer chassis forward of said shaft and its rollers, a base-plate pivotally mounted on said tractor chassis for oscillation on a transverse axis, a turn table mounted on said base-plate to swivel in a horizontal plane, a housing open at its rearward side connected with said turn table, a star-wheel mounted in said housing to rotate in a longitudinal vertical plane, said star wheel being adapted to rotate under bumping contact with said coupling yoke to thereby turn one of its arms upwardly behind and within the embrace of said coupling yokes, a latch member pivoted in connection with said turn-table, said latch member normally engaging an arm of said star wheel to hold the same against backward rotation while yielding to forward rotation thereof, a depending balancing arm connected with the pivoted end of said latch-member, a manually controlled releasing means operating through said depending arm to move said latch member out of operative relation to said star-wheel, and an inclined plane fixed to the rear end of said tractor chassis with the upper forward end of which said turn table is normally alined for the purposes described.

In testimony that I claim the invention set forth above I have hereunto set my hand this 28th day of February, 1920.

CHARLES J. JOHNSON.

Witnesses:
 GUSTAVE A. JOHNSON,
 GEORGE D. RICHARDS.